(12) United States Patent
Ito et al.

(10) Patent No.: US 8,174,218 B2
(45) Date of Patent: May 8, 2012

(54) SERVOMOTOR CURRENT CONTROL METHOD AND SERVOMOTOR

(75) Inventors: Takamichi Ito, Numazu (JP); Jun Fujita, Numazu (JP)

(73) Assignee: Toshiba Kikai Kabushiki Kaisha, Tokyo (JP)

(*) Notice: Subject to any disclaimer, the term of this patent is extended or adjusted under 35 U.S.C. 154(b) by 393 days.

(21) Appl. No.: 12/436,195

(22) Filed: May 6, 2009

(65) Prior Publication Data

US 2009/0278482 A1 Nov. 12, 2009

(30) Foreign Application Priority Data

May 9, 2008 (JP) ................................ 2008-123162

(51) Int. Cl.
*H02P 21/00* (2006.01)
(52) U.S. Cl. .................... 318/400.02; 318/625
(58) Field of Classification Search ............ 318/400.02, 318/625, 727, 798, 799, 809
See application file for complete search history.

(56) References Cited

U.S. PATENT DOCUMENTS

| | | | | |
|---|---|---|---|---|
| 4,302,693 A | * | 11/1981 | Burgmeier et al. | ...... 310/156.59 |
| 5,144,211 A | * | 9/1992 | Daggett et al. | ............ 318/568.11 |
| 5,631,512 A | * | 5/1997 | Kawabata et al. | ....... 310/156.15 |
| 6,166,514 A | * | 12/2000 | Ando et al. | ..................... 318/811 |
| 6,427,104 B1 | | 7/2002 | Matsushita et al. | |
| 6,906,442 B2 | | 6/2005 | Yamaguchi | |
| 6,924,617 B2 | * | 8/2005 | Schulz et al. | ................. 318/701 |
| 7,053,581 B2 | | 5/2006 | Chen et al. | |
| 7,332,837 B2 | | 2/2008 | Ward et al. | |
| 7,489,099 B2 | | 2/2009 | Fujiwara et al. | |
| 7,728,536 B2 | | 6/2010 | Katsumata et al. | |
| 2004/0119373 A1 | | 6/2004 | Akatsu | |
| 2005/0017588 A1 | | 1/2005 | Yamaguchi | |
| 2006/0049792 A1 | | 3/2006 | Chen et al. | |
| 2008/0067960 A1 | | 3/2008 | Maeda et al. | |
| 2009/0120714 A1 | | 5/2009 | Hisanaga et al. | |

FOREIGN PATENT DOCUMENTS

| | | |
|---|---|---|
| JP | 09-084400 | 3/1997 |
| JP | 11-178399 | 7/1999 |
| JP | 2002-305899 | 10/2002 |
| JP | 2006-074933 | 3/2006 |

(Continued)

OTHER PUBLICATIONS

Yu, Jeogn-Woong and Woo, Kwang-Joo, "The Controller Design of the Permanent Magnet Synchronous Drive Using an Inverter with Phase Compensator", Journal of the Korean Institute of Electrical Engineers, Mar. 1988, vol. 3, No. 3, pp. 146-154.

(Continued)

*Primary Examiner* — Rina Duda
(74) *Attorney, Agent, or Firm* — DLA Piper LLP US

(57) ABSTRACT

A method of controlling a current by supplying a d-axis current in order to prevent a voltage saturation includes: defining an amount of the d-axis current as $Id=|Idmax|\cdot\sin\theta$; continuously comparing a voltage command value with the voltage command value threshold Vo in a predetermined cycle; extracting a predetermined number No of latest comparison results in terms of time; setting a phase angle $\theta$ to be $0°$ when a number N of the comparison results out of the predetermined number No of the comparison results is equal to or less than an integer Nb; and increasing the phase angle $\theta$ depending on largeness of the number N when the number N is more than the integer Nb.

7 Claims, 9 Drawing Sheets

FOREIGN PATENT DOCUMENTS

| | | |
|---|---|---|
| JP | 2007-097275 | 4/2007 |
| JP | 2007-151294 | 6/2007 |
| KR | 10-2007-0058579 | 6/2007 |
| WO | WO 2008-047438 | 4/2008 |

OTHER PUBLICATIONS

Notice of Allowance issued in Korean Appl 10-2009-39979 on Dec. 20, 2010.
English Translation of Notice of Allowance issued in Korean Appl 10-2009-39979 on Dec. 20, 2010.
Image File Wrapper of U.S. Appl. No. 11/574,608 as of Mar. 14, 2011.
English Abstract of KR 10-2007-0058579 published on Jun. 8, 2007.
English Abstract of JP 2007-97275 published Apr. 12, 2007.
English Translation of JP 2007-97275 published Apr. 12, 2007.
Notice of Allowance issued in U.S. Appl. No. 11/574,608 on Jan. 26, 2010.
English Abstract of JP-09-084400.
English Abstract of JP-2007-151294.
English Abstract of JP-2006-074933.
English Abstract of JP-2002-305899.
English Abstract of JP-11-178399.
Machine English translation of JP-09-084400.
Machine English translation of JP-2007-151294.
Machine English translation of JP-2007-074933.
Machine English translation of JP-2002-305899.
Machine English translation of JP-11-178399.
Office Action issued in U.S. Appl. No. 11/574,608 dated Jul. 7, 2009.
English Abstract of JP-09-084400 published Mar. 28, 1997.
English Abstract of JP-2007-151294 published Jun. 14, 2007.
English Abstract of JP-2006-074933 published Mar. 16, 2006.
English Abstract of JP-2002-305899 published Oct. 18, 2002.
English Abstract of JP-11-178399 published Jul. 2, 1999.
Machine English translation of JP-09-084400 published Mar. 28, 1997.
Machine English translation of JP-2007-151294 published Jun. 14, 2007.
Machine English translation of JP-2007-074933 published Mar. 16, 2006.
Machine English translation of JP-2002-305899 published Oct. 18, 2002.
Machine English translation of JP-11-178399 published Jul. 2, 1999.

* cited by examiner

SERVOMOTOR CURRENT CONTROL METHOD AND SERVOMOTOR

BACKGROUND OF THE INVENTION

1. Field of the Invention

The present invention relates to a servomotor current control method, a current control program, a recording medium, a servomotor and an injection molding machine. More particularly, the present invention relates to a current control method, a current control program, a recording medium, a servomotor and an injection molding machine to prevent an armature voltage saturation by supplying a d-axis current to a dq-converted armature of the servomotor.

2. Description of Related Art

In order to prevent an armature voltage saturation of a servomotor, a d-axis current Id is supplied to a dq-converted armature where a d-axis direction coincides with a direction of magnetic field flux (for example, see Document 1: JP-9-84400 (Pages 2 to 4, FIGS. 2 and 9)). In the servomotor, a q-axis current Iq is an active current that generates a torque while the d-axis current Id is a reactive current that does not contribute to the generation of the torque. However, by supplying the reactive d-axis current Id, the influence of back electromotive force that occurs in an armature can be reduced, thereby preventing the voltage saturation. Thus, a larger amount of the q-axis current Iq can be supplied. Consequently, the current and torque can be stably controlled.

The above arrangements are shown in FIGS. 2 and 9 of Document 1. FIGS. 2 and 9 show a d-axis voltage Vd and a q-axis voltage Vq which are mutually orthogonal and divided from an armature voltage. A total vector sum of the d-axis voltage Vd and q-axis voltage Vq is equivalent to a total armature voltage applied to the armature. A circle shown in each drawing represents a link voltage that defines an upper limit of the total armature voltage. Accordingly, when the end of the total armature voltage vector falls within the link voltage circle, a desirable armature voltage can be applied to the armature in accordance with the indication of each drawing. Conversely, when the end of the total armature voltage vector goes out of the link voltage circle, the voltage saturation occurs. Thus, the desirable voltage cannot be applied to the armature in accordance with the indication of each drawing, which means that a desirable q-axis current Iq for generating the toque cannot be supplied to the armature.

In the drawings, back electromotive force E, which is a vector of a +q-axis direction, is expressed by a known equation $E = \omega \cdot \Phi$ for a synchronous servomotor. In this equation, $\omega$ denotes a rotation angular speed of the servomotor, and $\Phi$ denotes total magnetic flux that is intersected with armature windings. (The following will be described assuming that $\omega \geq 0$ and $\Phi \geq 0$, unless otherwise noted.)

Since the back electromotive force $E (=\omega \cdot \Phi)$ is proportional to $\omega$, the back electromotive force E is increased as the servomotor rotates at higher speed. In FIG. 9, when the back electromotive force vector E is increased during the high-speed rotation, the end of the vector approaches the circumference of the link voltage circle, so that a large amount of the q-axis current Iq cannot be supplied. This is because, when the large amount of the q-axis current Iq is supplied, a drive voltage vector of a +q-axis direction (the same direction as E) expressed as R·Iq in FIG. 9 is elongated, so that the end of the vector sum E+R·Iq goes out of the link voltage circle and therefore the voltage saturation occurs.

However, when the d-axis current Id ($\leq 0$) is supplied at this time as shown in FIG. 2, the above-described problem does not occur. This is because, by supplying the d-axis current Id, an offset voltage vector $-\omega \cdot L \cdot |Id|$ can be generated in a direction opposite to the back electromotive force vector E (−q-axis direction). Due to this offset voltage vector of the −q-axis direction, the end of the total armature voltage vector, i.e., the vector sum, can stay within the link voltage circle even when the drive voltage vector R·Iq of the +q-axis direction is elongated. Accordingly, when the d-axis current Id is supplied, the large amount of the q-axis current Iq can be continuously supplied even during the high-speed rotation. Thus, a large torque ($\propto Iq$) can be stably and constantly generated.

Further, in order to prevent a voltage saturation using a d-axis current Id, a current control method in which an, amount of the d-axis current Id is controlled based on a voltage command value for an armature winding has been known. According to this method, the voltage saturation can be appropriately prevented without supplying an extra amount of the d-axis current Id (for example, see Document 2: JP-A-2007-151294).

In the servomotor disclosed in Document 1, since the back electromotive force $E (=\omega \cdot \Phi)$ is proportional to the rotation angular speed $\omega$, the d-axis current Id is defined as a one variable function only depending on the rotation angular speed $\omega$. Then, the voltage saturation is prevented by supplying the d-axis current Id that is increased in a negative direction as the rotation angular speed $\omega$ is increased. (Hereinafter, the d-axis current Id is supplied always in the negative direction. Thus, "increase in the negative direction" and "decrease in the negative direction" are simply referred to as "increase" and "decrease" in the following description.)

In the servomotor disclosed in Document 1, the large amount of the d-axis current Id is continuously supplied during the high-speed rotation ($\omega$: large). However, even during the high-speed rotation, a generated torque is small when a load applied to the servomotor is low. Accordingly, the q-axis current Iq ($\propto$ torque) can be reduced. Then, the drive voltage vector R·Iq can be shortened in FIG. 9, so that the end of the total armature voltage vector, i.e., the vector sum, can stay within the link voltage circle. Consequently, the voltage saturation is hardly generated. At this time, the offset voltage vector $-\omega \cdot L \cdot |Id|$ that prevents the voltage saturation can be also reduced. Thus, the large amount of the d-axis current Id does not need to be supplied. As described above, it is not necessary that the large amount of the d-axis current Id is continuously supplied even during the high-speed rotation in order to prevent the voltage saturation as in the servomotor disclosed in Document 1. Since an extra amount of the d-axis current Id that is originally not required is continuously supplied, excess heat that need not originally be generated is constantly generated in the servomotor disclosed in Document 1. As a result, various problems may be occurred. For instance, additional compensatory measures may be required in view of maintenance management of the servomotor, or energy efficiency of the servomotor may be deteriorated.

Also, in the servomotor disclosed in Document 1, the d-axis current Id is small during the low-speed rotation ($\omega$: small). However, for instance, when a high load is applied to the servomotor even during the low-speed rotation, a generated torque needs to be increased. Accordingly, the q-axis current Iq ($\propto$ torque) needs to be increased. Then, the drive voltage vector R·Iq is elongated in FIG. 9, so that the end of the total armature voltage vector, i.e., the vector sum, is difficult to stay within the link voltage circle even when the back electromotive force E is small during the low-speed rotation. Consequently, the voltage saturation is easily generated. At this time, the offset voltage vector $-\omega \cdot L \cdot |Id|$ needs to be increased to prevent the voltage saturation. However, only a small amount of the d-axis current Id is supplied during the low-speed rotation in the servomotor disclosed in Document 1, so that the offset voltage vector remains small and is not sufficient to prevent the voltage saturation.

As described above, in the servomotor disclosed in Document 1, the amount of the d-axis current Id is variable depending on the rotation angular speed ω. Thus, an excess amount of the d-axis current Id may be supplied during the high-speed rotation, while the voltage saturation may not be appropriately prevented during the low-speed rotation.

On the other hand, in the servomotor disclosed in Document 2, the d-axis current Id and q-axis current Iq are given by the equations of Id=−|I|·sin θ and Iq=I·cos θ, where I denotes a total current flowing through the armature and θ denotes a phase angle (0°≦θ≦90°). The phase angle θ is controlled based on voltage command values serving as command values for armature voltages applied to armature windings of phases.

In the servomotor disclosed in Document 2, the d-axis current Id is defined based on the voltage command values, not the rotation angular speed ω. Thus, the voltage saturation can be prevented without supplying an excess amount of the d-axis current Id even during the high-speed rotation.

However, in the servomotor disclosed in Document 2, the d-axis current Id is supplied every time the voltage command values exceed a voltage command value threshold Vo. Since the voltage saturation is not necessarily generated when the voltage command values exceed the voltage command value threshold Vo, an excess amount of the d-axis current may be also supplied in the servomotor disclosed in Document 2.

SUMMARY OF THE INVENTION

An object of the invention is to provide a current control method, a current control program, a recording medium, a servomotor and an injection molding machine, which are capable of appropriately preventing a voltage saturation without excessively supplying a d-axis current.

According to the aspect of the invention, a method of controlling a current in a servomotor by supplying a d-axis current to an armature, the servomotor comprising a magnetic field and the armature including armature windings of plural phases, the armature having been subjected to such dq conversion as to bring a d-axis direction into coincidence with a direction of a magnetic field flux, the d-axis current being supplied for prevention of a voltage saturation of the armature when a relative rotation power of the magnetic field and the armature is generated based on an interaction between the magnetic field flux generated by the magnetic field and an armature magnetic flux generated by applying an armature voltage to the armature winding of each phase, the method includes: determining a phase angle θ (0°≦θ≦90°); and defining an amount of the d-axis current supplied to the armature, wherein the determining of the phase angle comprises setting a predetermined voltage command value threshold Vo that is smaller than a maximum armature voltage Vmax, the maximum armature voltage Vmax being applicable to the armature winding of each phase without generating the voltage saturation; continuously comparing a voltage command value with the voltage command value threshold Vo in a predetermined cycle, the voltage command value being a command value of the armature voltage applied to the armature winding of each phase; extracting a predetermined number No of latest comparison results in terms of time from comparison results continuously obtained in the predetermined cycle; setting the phase angle θ to be 0° when a number N of the comparison results out of the predetermined number No of the comparison results is equal to or less than an integer Nb, the number N being a number of the comparison results that show that at least one of the voltage command values is more than the voltage command value threshold Vo, the integer Nb being set to be less than the predetermined number No; and increasing the phase angle θ depending on largeness of the number N when the number N is more than the integer Nb, and the defining of the amount of the d-axis current comprises: defining a q-axis current Iq by an equation (1) and defining the d-axis current Id by an equation (2) using the phase angle θ determined in the determining of the phase angle, $$Iq = I \cdot \cos \theta \quad (1)$$

$$Id = -|Id\text{max}| \cdot \sin \theta \quad (2)$$

where I in the equation (1) represents a q-axis current command value for the armature when the d-axis current is not supplied and Idmax in the equation (2) represents a maximum d-axis current that is suitably settable.

In the method according to the aspect of the invention, the d-axis current Id is controlled by determining the phase angle and defining the amount of the d-axis current.

In the defining of the amount of the d-axis current, the d-axis current Id is given by the equation (2).

In the equation (2), Id equals to 0 when θ equals to 0° and therefore the d-axis current Id is not supplied. Conversely, Id is less than 0 when θ is not 0° (0°<θ≦180°) and therefore the d-axis current Id is supplied. As θ is increased, the d-axis current Id is increased (in the negative direction), thereby increasing an offset voltage vector that prevents the voltage saturation.

On the other hand, in the determining of the phase angle, the phase angle θ is determined based on a past value of each voltage command value applied to the armature winding of each phase.

More specifically, the voltage command value of each phase and the voltage command value threshold Vo are compared with each other in a cyclic manner, and the phase angle θ is controlled based on the latest predetermined number No of comparison results in terms of time.

The comparison results are divided into a result indicating "none of the voltage command values exceeds the voltage command value threshold Vo" (low possibility of the occurrence of the voltage saturation) and the other result indicating "at least one of the voltage command values exceeds the voltage command value threshold Vo" (high possibility of the occurrence of the voltage saturation).

N denotes the number of the comparison results indicating "at least one of the voltage command values exceeds the voltage command value threshold Vo" (high possibility of the occurrence of the voltage saturation) out of the predetermined number No of the extracted comparison results.

In the determining of the phase angle, the phase angle θ is set to be 0° when the number N is equal to or less than the integer Nb set to be less than the predetermined number No. On the other hand, the phase angle θ is increased as the number N is increased when the number N is more than the integer Nb.

In other words, when the number N is equal to or less than the integer Nb and the voltage command does not often exceed the voltage command value threshold Vo, the voltage saturation is less likely to occur. Thus, θ is set to be 0° in order not to supply the d-axis current Id.

Conversely, when the number N is more than the integer Nb and the voltage command value of each phase often exceeds the voltage command value threshold Vo, the voltage saturation is likely to occur. Thus, the d-axis current Id is supplied. At this time, the voltage saturation occurs more easily as the number N is increased. Accordingly, the phase angle θ is increased corresponding to the number N.

In the method according to the aspect of the invention, based on the voltage command value for the armature winding of each phase directly related to the occurrence of the armature voltage saturation, a minimum amount of the d-axis current Id can be supplied only when the voltage saturation is likely to occur. Thus, the voltage saturation can be appropriately prevented without supplying an excess amount of the d-axis current Id.

In the method according to the aspect of the invention, it is preferable that the maximum d-axis current Idmax satisfies a relationship of I<Idmax≦Imax, where Imax represents an allowable maximum current value of the armature.

In the servomotor disclosed in Document 2, the d-axis current Id is defined based on the total current I of the armature. Thus, the d-axis current Id is small when the total current I is small, so that the voltage saturation may not be prevented.

However, according to the aspect of the invention, the d-axis current Id is defined based on the maximum d-axis current Idmax that is larger than the total current I of the armature. Thus, the voltage saturation can be prevented even when the total current I is small.

In the method according to the aspect of the invention, it is preferable that the maximum d-axis current Idmax is equal to the allowable maximum current value Imax.

According to the above arrangement, the d-axis current can be increased to the allowable maximum current value Imax, thereby increasing the q-axis current Iq to obtain a high torque.

In the method according to the aspect of the invention, the determining of the phase angle farther comprises setting a maximum value θmax of the phase angle θ (0°<θmax≦90°); and obtaining the phase angle θ from an equation of θ={(N−Nb)/(No−Nb)}·θmax when the number N is more than the integer Nb.

According to the above arrangement, the phase angle θ is set to be 0 when the number N is equal to or less than the integer Nb, and the phase angle θ is increased as the number N is increased when the number N is more than the integer Nb.

A current control program for use in a computer installed in a servomotor comprising a magnetic field and an armature including armature windings of plural phases, the current control program controlling a current by supplying a d-axis current to the armature, the armature having been subjected to such dq conversion as to bring a d-axis direction into coincidence with a direction of a magnetic field flux, the d-axis current being supplied for prevention of a voltage saturation of the armature when a relative rotation power of the magnetic field and the armature is generated based on an interaction between the magnetic field flux generated by the magnetic field and an armature magnetic flux generated by applying an armature voltage to an armature winding of each phase, the current control program operates the computer to perform: determining a phase angle θ (0°≦θ≦90°); and defining an amount of the d-axis current supplied to the armature, wherein the determining of the phase angle comprises: setting a predetermined voltage command value threshold Vo that is smaller than a maximum armature voltage Vmax, the maximum armature voltage Vmax being applicable to the armature winding of each phase without generating the voltage saturation; continuously comparing a voltage command value with the voltage command value threshold Vo in a predetermined cycle, the voltage command value being a command value of the armature voltage applied to the armature winding of each phase; extracting a predetermined number No of latest comparison results in terms of time from comparison results continuously obtained in the predetermined cycle; setting the phase angle θ to be 0° when a number N of the comparison results out of the predetermined number No of the comparison results is equal to or less than an integer Nb, the number N being a number of the comparison results that show that at least one of the voltage command values is more than the voltage command value threshold Vo, the integer Nb being set to be less than the predetermined number No; and increasing the phase angle θ depending on largeness of the number N when the number N is more than the integer Nb, and the defining of the amount of the d-axis current comprises: defining a q-axis current Iq by an equation (1) and defining the d-axis current Id by an equation (2) using the phase angle θ determined in the determining of the phase angle, $$Iq = I \cdot \cos\theta \qquad (1)$$

$$Id = -|Id\mathrm{max}| \cdot \sin\theta \qquad (2)$$

where I in the equation (1) represents a q-axis current command value for the armature when the d-axis current is not supplied and Idmax in the equation (2) represents a maximum d-axis current that is suitably settable.

According to another aspect of the invention, a recording medium records the above-described current control program in a computer-readable manner and is readable by the computer installed in the servomotor.

The current control program and recording medium as described above are used for carrying out the method according to the aspect of the invention. Thus, the same advantages can be attained as the method according to the aspect of the invention.

A servomotor, comprising: a magnetic field; an armature including armature windings of plural phases; and a controller that controls the magnetic field and the armature, the servomotor supplying a d-axis current to the armature subjected to such dq conversion as to bring a d-axis direction into coincidence with a direction of a magnetic field flux, the de-axis current being supplied for prevention of a voltage saturation of the armature when a relative rotation power of the magnetic field and the armature is generated based on an interaction between the magnetic field flux generated by the magnetic field and an armature magnetic flux generated by applying an armature voltage to the armature winding of each phase, the servomotor further comprising: a calculator that determines an amount of the d-axis current, wherein the calculator performs determining a phase angle θ (0°≦θ≦90°) and defining an amount of the d-axis current supplied to the armature, the determining of the phase angle comprises: setting a predetermined voltage command value threshold Vo that is smaller than a maximum armature voltage Vmax, the maximum armature voltage Vmax being applicable to the armature winding of each phase without generating the voltage saturation; continuously comparing a voltage command value with the voltage command value threshold Vo in a predetermined cycle, the voltage command value being a command value of the armature voltage applied to the armature winding of each phase; extracting a predetermined number No of latest comparison results in terms of time from comparison results continuously obtained in the predetermined cycle; setting the phase angle θ to be 0° when a number N of the comparison results out of the predetermined number No of the comparison results is equal to or less than an integer Nb, the number N being a number of the comparison results that show that at least one of the voltage command values is more than the voltage command value threshold Vo, the integer Nb being set to be less than the predetermined number No; and increasing the phase angle θ depending on largeness of the number N when the number N is more than the integer Nb, and the defining of the amount of the d-axis current comprises: defining a q-axis current Iq by an equation (1) and defining the d-axis current Id by an equation (2) using the phase angle θ determined in the determining of the phase angle, $$Iq = I \cdot \cos\theta \quad (1)$$

$$Id = -|Idmax| \cdot \sin\theta \quad (2)$$

where I in the equation (1) represents a q-axis current command value for the armature when the d-axis current is not supplied and Idmax in the equation (2) represents a maximum d-axis current that is suitably settable.

The servomotor as described above has an arrangement for carrying out the method according to the aspect of the invention. Thus, the same advantages can be attained as the method according to the aspect of the invention.

Incidentally, a computer capable of executing the above-described current control program can serve as the controller. The controller is not limited to the computer, but may be any components that can carry out the current control method. For instance, the controller-may be a servo amplifier or a servo controller.

An injection molding machine according to still another aspect of the invention, includes the above-described servomotor.

Since such an injection molding machine includes the above-described servomotor, the voltage saturation can be prevented without supplying an excess amount of the d-axis current Id.

Consequently, the injection molding machine according to the still another aspect of the invention can restrain power consumption during low-load operation, and can perform a normal molding while restraining the voltage saturation during high-load operation.

DETAILED DESCRIPTION OF PREFERRED EMBODIMENT(S)

Exemplary embodiment(s) of the invention will be described below with reference to the attached drawings.

First Exemplary Embodiment

Figure 1:
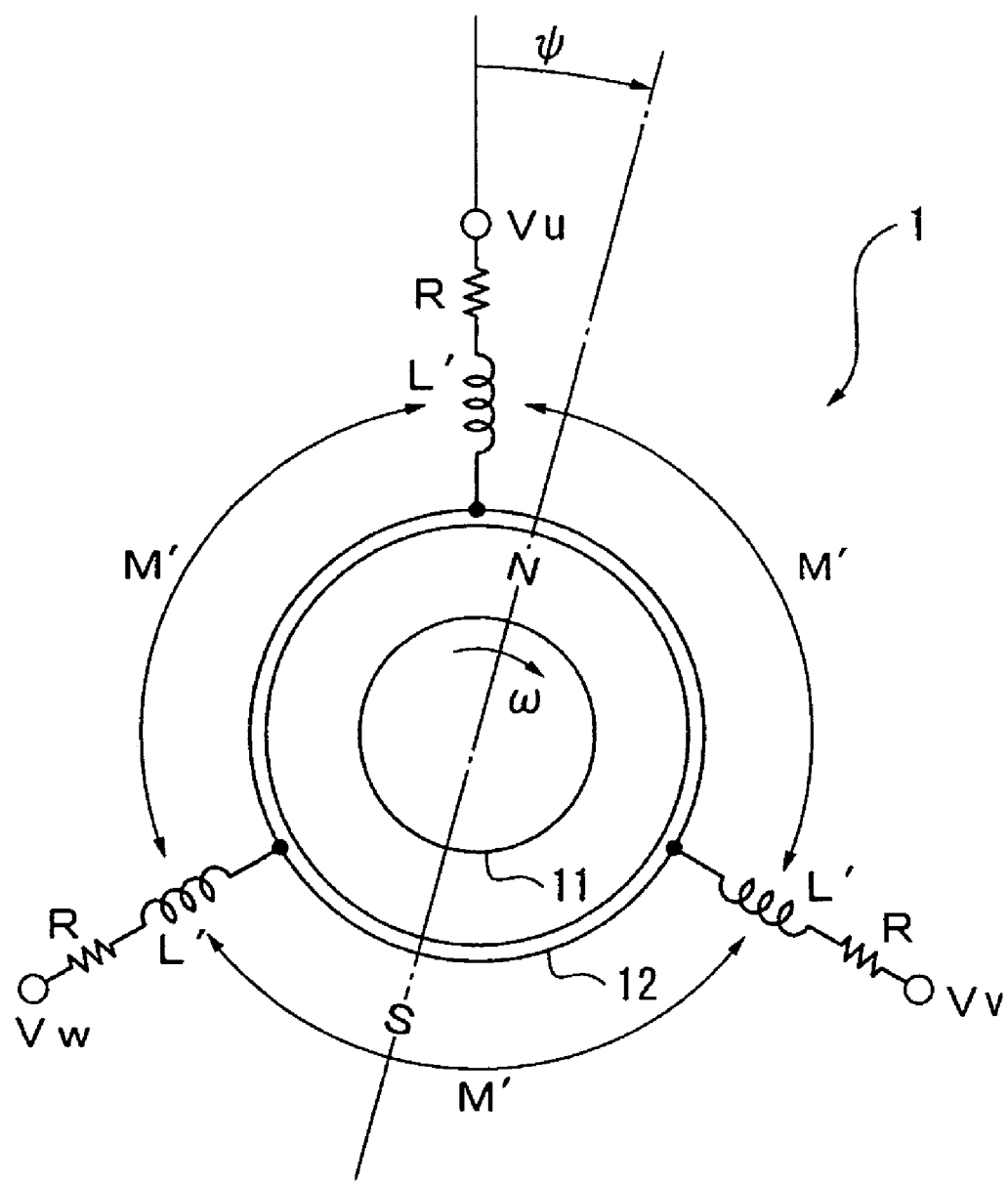
FIG. 1 is an equivalent circuit diagram of a servomotor according to a first exemplary embodiment of the invention.

FIG. 1 is an equivalent circuit diagram of a servomotor 1 according to a first exemplary embodiment of the invention.

The servomotor 1 is a three-phase synchronous motor including a magnetic field 11 provided by a permanent magnet, and an armature 12 having armature windings of three phases (u-phase, v-phase, w-phase). The magnetic field 11 is rotatable as a rotor. When AC voltages (armature voltages) whose phases are mutually different by 120 degrees are respectively applied to the armature windings of the phases of the armature 12 serving as a stator, armature magnetic flux that rotates with the same frequency as that of the AC voltages can be generated. The magnetic field 11 receives such magnetic force that causes magnetic flux of the magnetic field 11 to be in parallel with the armature flux, so that the magnetic field 11 is rotated in a manner following the armature magnetic flux (A rotation angle is represented by ψ, and a rotation angular speed is represented by ω=dψ/dt. Hereinafter, the rotation angular speed is assumed to be ω≧0 (clockwise rotation) unless otherwise noted.).

In the servomotor 1, rotation force is generated as described above.

In FIG. 1, Vu, Vv and Vw denote armature voltages of the respective phases of the armature 12, R denotes a resistance common to the respective phases, L' denotes a self-inductance common to the respective phases, and M' denotes a mutual-inductance between the respective phases. The rotation angle ψ of the magnetic field 11 is defined as an angle between a direction of the magnetic field flux (i.e., the direction connecting N pole and S pole of the magnetic field 11) and a direction of forming the u-phase of the armature 12.

Figure 2:
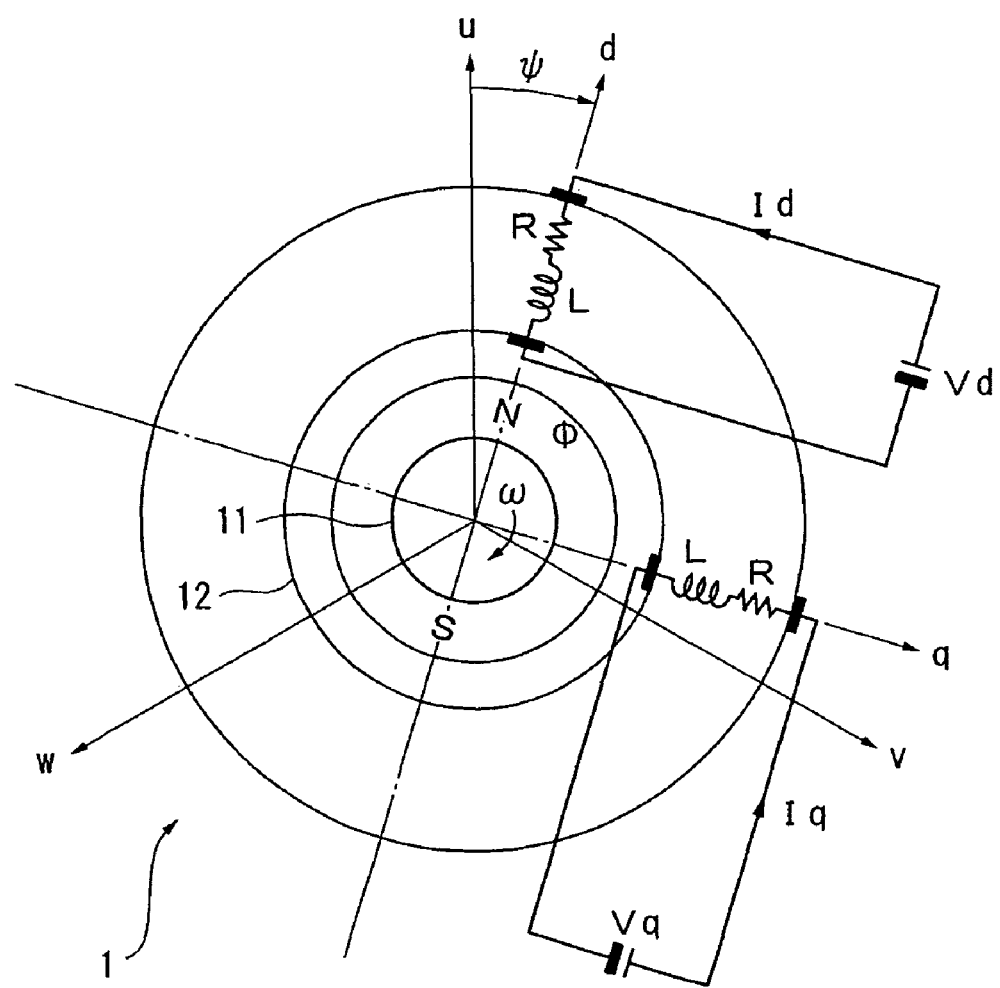
FIG. 2 is an equivalent circuit diagram obtained by performing a dq-conversion on the servomotor according to the first exemplary embodiment.

When the servomotor 1 of FIG. 1 is dq-converted, an equivalent circuit of FIG. 2 is obtained.

In FIG. 2, a d-axis is coincident with the direction of the magnetic field flux, and a q-axis extends in a direction perpendicular to the d-axis. The armature windings of three phases shown in FIG. 1 are converted into armature windings of two phases, i.e., a d-phase and q-phase.

In FIG. 2, Vd and Vq denote armature voltages of the respective phases, Id and Iq denote armature currents of the respective phases, R denotes a resistance common to the respective phases, L denotes a self-inductance common to the respective phases, and Φ denotes a total magnetic flux that is intersected with the armature windings of the respective phases. These satisfy a known circuit equation (3) for a synchronous motor as follows.

$$\begin{bmatrix} Vd \\ Vq \end{bmatrix} = \begin{bmatrix} R+PL & -\omega L \\ \omega L & R+PL \end{bmatrix} \begin{bmatrix} Id \\ Iq \end{bmatrix} + \begin{bmatrix} 0 \\ \omega \cdot \Phi \end{bmatrix} \quad (3)$$

In the equation, P represents a differential operator d/dt. A second term of a right-hand side of this equation represents back electromotive force induced in the respective armature windings of the d and q phases. As is obvious from the equation, the back electromotive force E (=ω·Φ) due to Φ is induced only in the armature winding of the q-phase.

In FIG. 2, the q-axis current Iq, which is perpendicular to the magnetic field flux in the d-axis direction, generates a torque T of the servomotor 1 (specifically, T∝Φ·Iq). Iq). On the other hand, the d-axis current Id is a reactive current that does not contribute to the generation of the torque T. However, as disclosed in Document 1, an offset voltage component that offsets the back electromotive force. E can be produced by supplying the negative d-axis current Id. Thus, the voltage saturation of the armature 12 can be prevented.

Figure 3:
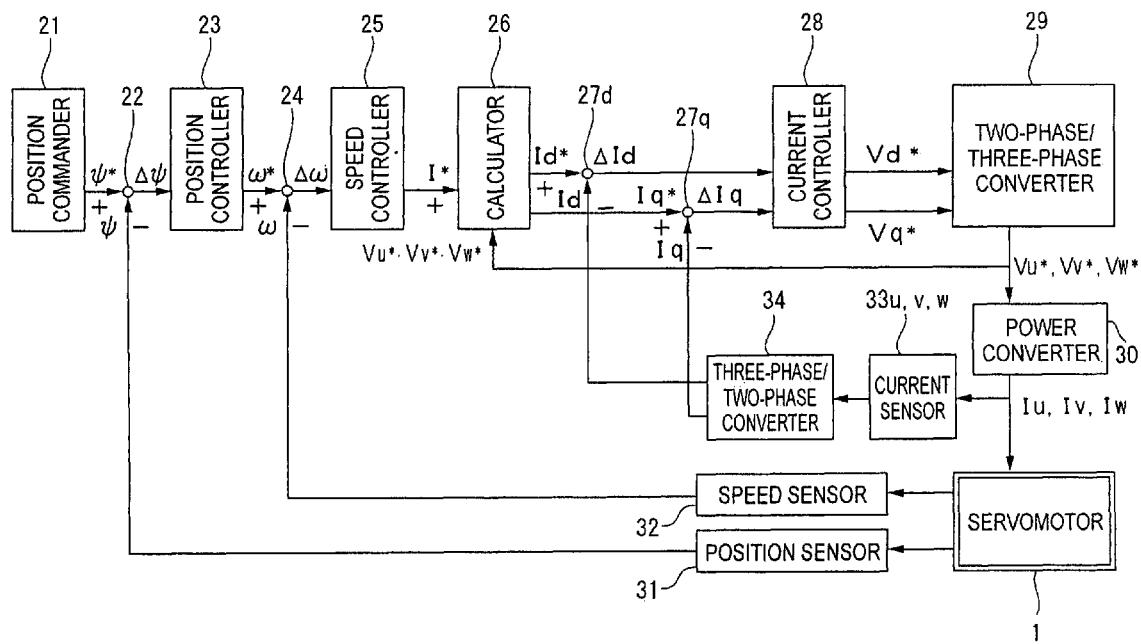
FIG. 3 is a feedback control block diagram in the servomotor according to the first exemplary embodiment.

FIG. 3 is a feedback control block diagram of the servomotor 1 shown in FIGS. 1 and 2.

A position commander 21 outputs a command value ψ* for a rotation angle of the servomotor 1 (a rotation angle ψ of the magnetic field 11) in accordance with a predetermined part program. A position comparator 22 compares the command value ψ* with an actual rotation angle ψ* measured by a position sensor 31, and then inputs an angle deviation Δψ=ψ*−ψ to a position controller 23. The position controller 23 serving as a speed commander performs a, predetermined calculation based on the angle deviation Δψ to calculate a command value ω* for a rotation angular speed of the servomotor 1, and then outputs the calculated command value ω*. A speed comparator 24 compares the command value ω* with an actual rotation angular speed ω measured by a speed sensor 32, and then inputs a speed deviation Δω=ω*−ω to a speed controller 25. The speed controller 25 serving as a total current commander performs a predetermined calculation based on the speed deviation Δω to calculate a command value I* for a total current (total armature current) of the armature 12 in the servomotor 1, and then outputs the calculated command value I* to a calculator 26.

The command value I* is a q-axis current command value for the armature 12 when the d-axis current is not supplied.

In addition to the total current command value I* outputted from the speed controller 25, voltage command values Vu*, Vv* and Vw* for u-, v- and w-phases outputted from a later-described two-phase/three-phase converter 29 are inputted to the calculator 26.

The calculator 26 performs a phase-angle determining process and a d-axis current defining process based on the above values.

In the d-axis current defining process, the q-axis current command Iq* is given by the following equation (1) and the d-axis current command Id* is given by the following equation (2).

$$Iq^* = I^* \cdot \cos\theta \tag{1}$$

$$Id^* = -|Id\text{max}| \cdot \sin\theta \tag{2}$$

In the equation (2), Idmax denotes the maximum d-axis current that is settable in any suitable manner. Idmax preferably satisfies the relationship: I<Idmax≤Imax, more preferably satisfies the relationship: Idmax=Imax.

In the phase-angle determining process, the phase angle θ (0°≤θ≤90°) in the equations (1) and (2) is determined as follows.

The calculator 26 preliminarily stores values of the maximum armature voltages Vmax applicable to the armature windings of the respective u-, v- and w-phases without generating the voltage saturation of the armature 12 in the servomotor 1, and values of predetermined voltage command value thresholds Vo set to be smaller than the respective maximum armature voltages Vmax. The values of the maximum armature voltages Vmax and voltage command value thresholds Vo may be different depending on the u-, v- and w-phases.

However, in the exemplary embodiment, all values of the respective maximum armature voltages Vmax of the u-, v- and w-phases are expressed as 100% in the percentage and all values of the respective voltage command value thresholds Vo of the u-, v- and w-phases are expressed as 90% in the percentage.

The calculator 26 receives the voltage command values Vu*, Vv* and Vw* for the respective phases from the two-phase/three-phase converter 29 in a predetermined cycle (for instance, 250 µs) and converts the values Vu*, Vv* and Vw* to be expressed in percentage. Then, the calculator 26 compares the converted values with the voltage command value thresholds Vo (=90%).

When the comparison shows that none of the voltage command values Vu*, Vv* and Vw* of the respective phases exceeds the voltage command value thresholds Vo, the calculator 26 stores a comparison result as "0". The comparison result "0" indicates that none of the voltage command values Vu*, Vv* and Vw* exceeds the voltage command value thresholds Vo and the voltage saturation is less likely to occur.

On the other hand, when the comparison shows that at least one of the voltage command values Vu*, Vv* and Vw* of the respective phases exceeds the voltage command value thresholds Vo, the calculator 26 stores a comparison result as "1". The comparison result "1" indicates that at least one of the voltage command values Vu*, Vv* and VW* exceeds the voltage command value thresholds Vo and the voltage saturation is likely to occur.

As described above, the calculator 26 stores the comparison result "0" or "1" depending on the received voltage command values Vu*, Vv* and Vw* of the respective phases. Since the calculator 26 receives the voltage command values Vu*, Vv* and Vw* of the respective phases in a predetermined cycle (for instance, 250 µs) as described above, the calculator 26 stores the comparison result "0" or "1" in the predetermined cycle.

The calculator 26 can store at least predetermined number (No) of the latest comparison results in terms of time, out of the comparison results to be stored in the predetermined cycle.

When the number of the comparison results "1" indicating the high possibility of the voltage saturation is set to be a number N and the number N is equal to or less than an integer Nb set to be less than the predetermined number No, the calculator 26 adjusts the phase angle θ to be 0°. When the number N is more than the integer Nb, the calculator 26 increases the phase angle θ as the number N is increased.

More specifically, when a maximum value θmax of the phase angle θ is set as 0°<θmax≤90° and the number N is more than the integer Nb, the phase angle θ is obtained from the equation θ={(N−Nb)/(No−Nb)}·θmax.

Figure 4:
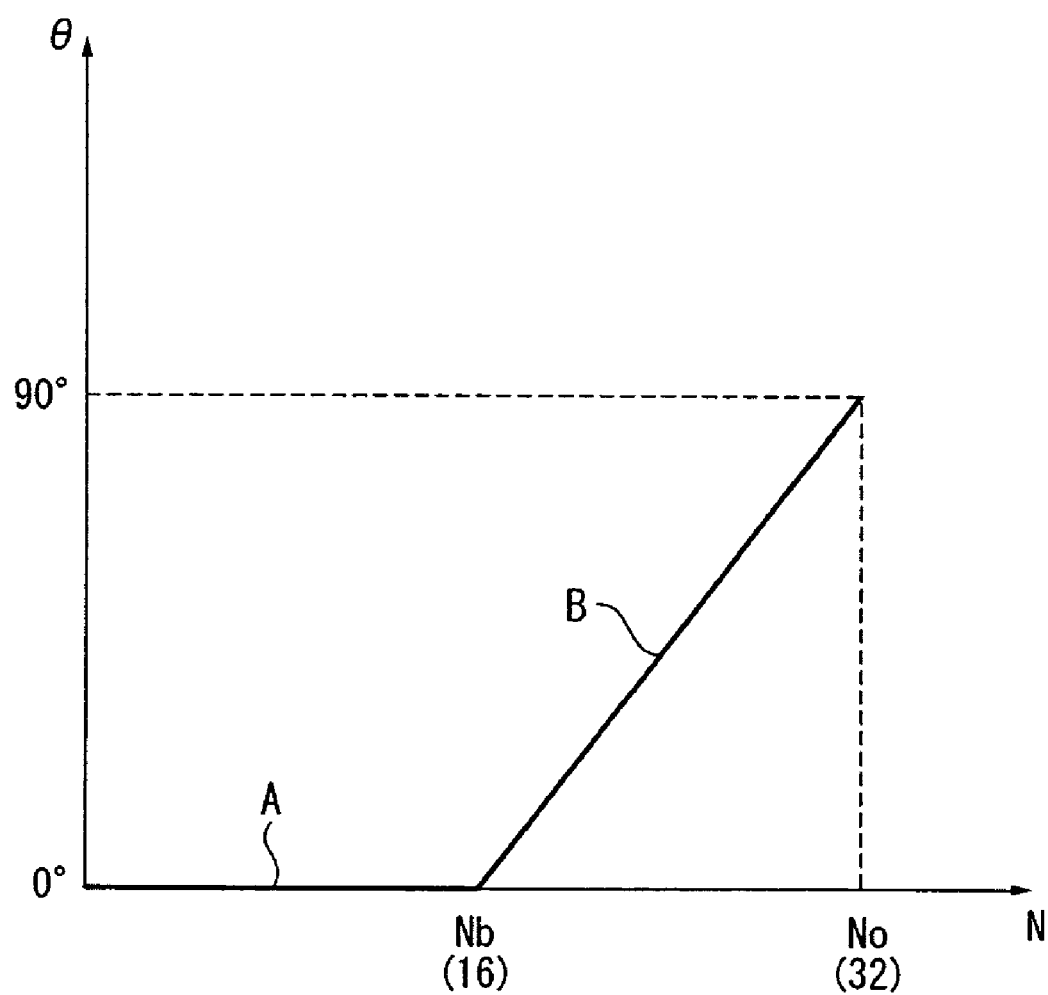
FIG. 4 is a graph showing the control of a phase angle θ in a phase-angle determining process according to the first exemplary embodiment.

For example, when No=32, Nb=16 and θmax=90°, the calculator 26 controls the phase angle θ as shown in FIG. 4 based on 32 comparison results.

In other words, the calculator 26 adjusts the phase angle θ to be 0° when N is 16 or less (see A of FIG. 4), and adjusts the phase angle θ to satisfy the equation θ={(N−Nb)/(No−Nb)}·θmax={(N−16)/(32−16)}·90°=(N/16)·90°−90° when N is more than 16 (see B of FIG. 4).

When N is 16 or less (when 16 or more comparison results out of the latest 32 results are stored as "0" indicating the low possibility of the voltage saturation), the calculator 26 adjust the phase angle θ to be 0°, whereby the d-axis current command Id* becomes 0. When N is more than 16 (when 17 or more comparison results out of the latest 32 results are stored as "1" indicating the high possibility of the voltage saturation), the calculator 26 adjusts the phase angle θ within the range of $0° < \theta \leq 90°$, whereby the d-axis current command Id* becomes a negative value. For example, when the comparison result "1" is stored 24 times out of the latest 32 comparison results, the phase angle $\theta$ is set to be 45°, whereby the Id* and Iq* are respectively determined by the equations of Id*=−|Imax|·(1/√2) and Iq*=I*·(1/√2). Then, $\theta$ is increased as the number N of the comparison results "1" is increased, whereby the Id*(=−|I*|·sin $\theta$) is also increased (in the negative direction). When N=32 (No), the equation $\theta$=90° is satisfied and therefore the Id* becomes the largest.

As described above, in the exemplary embodiment, the phase angle $\theta$ is controlled based on the past values (the latest 32 comparison results) of the voltage command values Vu*, Vv* and Vw* for the respective u-, v-, and w-phases, thereby controlling the amount of the d-axis current command Id*. Incidentally, in this exemplary embodiment, a new comparison result is obtained in such a predetermined cycle that the calculator 26 receives the voltage command values Vu*, Vv* and Vw of the respective phases. The oldest comparison result out of the 32 comparison results used for determination of the phase angle $\theta$ is replaced by the new comparison result. Since the latest 32 comparison results used for the determination of the phase angle $\theta$ are sequentially updated in the predetermined cycle, the phase angle $\theta$ is also sequentially updated in the predetermined cycle.

D-axis and q-axis current comparators 27d and 27q compares the d-axis and q-axis current commands Id* and Iq* outputted from the calculator 26 with actual d-axis and q-axis currents Id and Iq supplied to the armature 12 of the servomotor 1, respectively, to input to a current controller 28 the d-axis and q-axis current deviations $\Delta$Id=$\Delta$d*−Id and $\Delta$Iq=Iq*−Iq. To obtain the d-axis and q-axis currents Id and Iq to be inputted to the current comparators 27d and 27q, the armature currents Iu, Iv and Iw of the u-, v- and w-phases of the three-phase servomotor 1 before the dq-conversion (see FIG. 1) are measured by current sensors 33u, 33v and 33w provided for the phases, respectively, and then these measured currents are converted into the d-axis and q-axis currents Id and Iq of two phases by the three-phase/two-phase converter 34.

Next, the current controller 28, into which the d-axis and q-axis current deviations $\Delta$Id and $\Delta$Iq are inputted, performs a predetermined calculation based on the inputted current deviations to calculate a d-axis voltage command Vd* and q-axis voltage command Vq*, and then outputs the calculated d- and q-axis voltage commands Vd* and Vq*.

The two-phase/three-phase converter 29 performs a predetermined calculation based on the inputs of the d- and q-axis voltage commands Vd* and Vq* to calculate voltage commands Vu*, Vv* and Vw* for three phases, i.e., u-, v- and w-phases, and then outputs the calculated voltage commands Vu*, Vv* and Vw* to a power converter 30. As described above, the voltage commands Vu*, Vv* and Vw* of the respective phases outputted from the two-phase/three-phase converter 29 are received by the calculator 26 in a predetermined cycle to be used for calculation of the phase angle $\theta$ that defines the amount of the d-axis current command Id*.

The power converter 30 applies to the armature windings of the u-, v- and w-phases using a power unit (not shown) armature voltages Vu, Vv and Vw based on the voltage commands values Vu*, Vv* and Vw* of three phases inputted from the two-phase/three-phase converter 29, and supplies to the armature windings of three phases armature currents Iu, Iv and Iw of three phases corresponding to the armature voltages.

As described above, in the servomotor 1, a computer serving as a controller performs a feedback loop to properly control the positions, speeds, voltages or currents.

Advantages of First Exemplary Embodiment

In the first exemplary embodiment, based on the voltage command values for the armature windings of the respective phases which are directly related to the occurrence of the armature voltage saturation, a minimal amount of the d-axis current Id can be supplied only when the voltage saturation is likely to occur. Thus, the voltage saturation can be appropriately prevented without supplying an excess amount of the d-axis current Id.

Also, in the first exemplary embodiment, the d-axis current command Id* is determined based on the maximum d-axis current Idmax that is larger than the total current I of the armature. Thus, unlike the servomotor disclosed in Document 2, the voltage saturation can be prevented even when the total current I is small.

Especially, by adjusting the maximum d-axis current Idmax to be equal to the allowable maximum current value Imax, the q-axis current Iq is maximized to obtain a high torque and favorable TN characteristics.

Further, the phase angle $\theta$ is determined based on a magnitude relation between the preliminarily set integer Nb and the number N. Thus, power consumption can be restrained without supplying the d-axis current Id when the number N is small and the voltage saturation is less likely to occur, and the voltage saturation can be prevented by supplying the d-axis current Id when the number N is large and the voltage saturation is likely to occur.

Second Exemplary Embodiment

An injection molding machine including the above-described servomotor 1 as a power source will be described in a second exemplary embodiment.

The injection molding machine of the second exemplary embodiment includes the servomotor 1 and a computer that controls the servomotor 1. The computer reads a current control program for carrying out the current control method of the invention.

A current control program reading method is not particularly limited, but, for instance, the computer may read the current control program via a recording medium that records the current control program.

Since the injection molding machine includes the above-described servomotor, the voltage saturation can be reliably prevented without supplying an excess amount of the d-axis current Id, thereby exhibiting the favorable TN characteristics.

Thus, the injection molding machine of the invention can restrain power consumption during low-load operation, and performs a normal molding while restraining the voltage saturation during high-load operation.

[Modification]

It should be noted that the invention is not limited to the above-described exemplary embodiments, but includes any modifications, improvements and the like as long as an object of the invention can be achieved.

The voltage command value thresholds Vo are set to be 90% of the maximum armature voltage Vmax and the No, Nb and $\theta$max are set to be 32, 16 and 90° respectively in the exemplary embodiments. However, the above-described values are not limited thereto and any other values may be set.

For example, θmax may be calculated back from a required amount of the d-axis current Id as follows.

A composite voltage V of the phase armature voltages Vd and Vq is given by $V=\sqrt{(Vd^2+Vq^2)}$, which is increased to $1/\sqrt{2}$ times as much as the maximum armature voltage Vmax. In other words, the voltage saturation occurs when $V=Vmax/\sqrt{2}$.

When a maximum performance of a desirable motor (a motor rotation speed to and a torque T thereof) is determined, a necessary amount of the q-axis current Iq can be calculated from the above circuit equation and an equation of $T=Kt\times Iq$.

In addition to the composite voltage V and the q-axis current Iq, the necessary amount of the d-axis current Id can be obtained by assigning a motor inherent resistance R, a self-inductance L, a total magnetic flux D that is intersected with an armature winging, a torque constant Kt and a desirable rotation speed X) in the above circuit equation (3).

When the necessary amount of the d-axis current Id is determined, θmax can be determined by the above equation (2).

As long as such θmax is set, the voltage saturation can be prevented even when the motor is operated with the above maximum performance.

Also, since a voltage applicable to an armature can be increased to $\sqrt{3}/2$ times as much as a maximum armature voltage Vmax in a typical current control system, for instance, the voltage command value threshold Vo may be given by the equation $Vo=Vmax\times\sqrt{3}/2$.

EXAMPLE

The invention will be described in detail with reference to Examples, but is not limited thereto.

Example 1

A polycarbonate battery case was molded using the injection molding machine of the second exemplary embodiment. An injection speed was 300 mm/sec.

Figure 5:
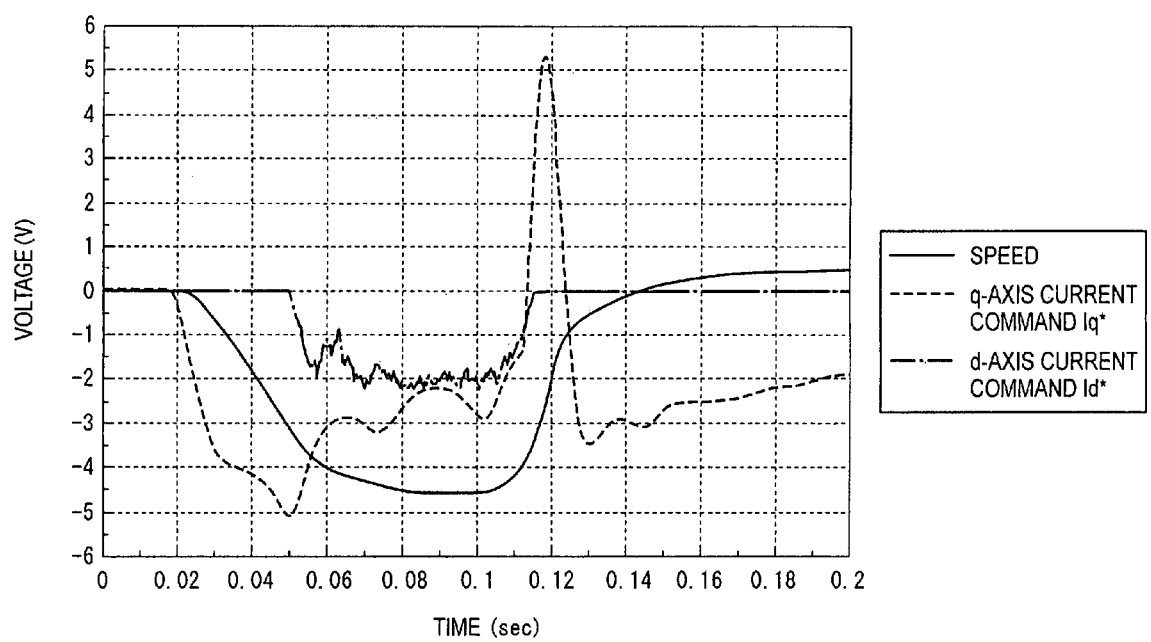
FIG. 5 is a graph showing a d-axis current command Id*, a q-axis current command Iq*, and a speed of an injection shaft according to Example 1.

FIG. 5 shows a d-axis current command Id*, a q-axis current command Iq*, and a speed of an injection shaft at this time. In FIG. 5, a longitudinal axis represents a voltage (V), and a horizontal-axis represents a time (sec). The speed was 63.8 mm/sec per 1V, and the d-axis current command Id* and the q-axis current command Iq* were 40.82 A per 1V.

Incidentally, an average value of the respective data when performing injection a plurality of times is graphed in Example 1 and the following Examples and Comparisons.

FIG. 5 shows the d-axis current command Id* was changed in the negative direction around 0.05 sec. A wave pattern was disturbed because θ was controlled based on such a frequency (number N) that the respective voltage commands exceeded the voltage command thresholds Vo.

In FIG. 5, the q-axis current command Iq* was within ±6V, so that the q-axis current Id was controlled without generating the voltage saturation.

The speed of the injection shaft was smoothly transited. Consequently, a favorable battery case without burrs and sink marks was obtained.

[Comparison 1]

A battery case was molded similarly to Example 1, except that the d-axis current Id was not supplied.

Figure 6:
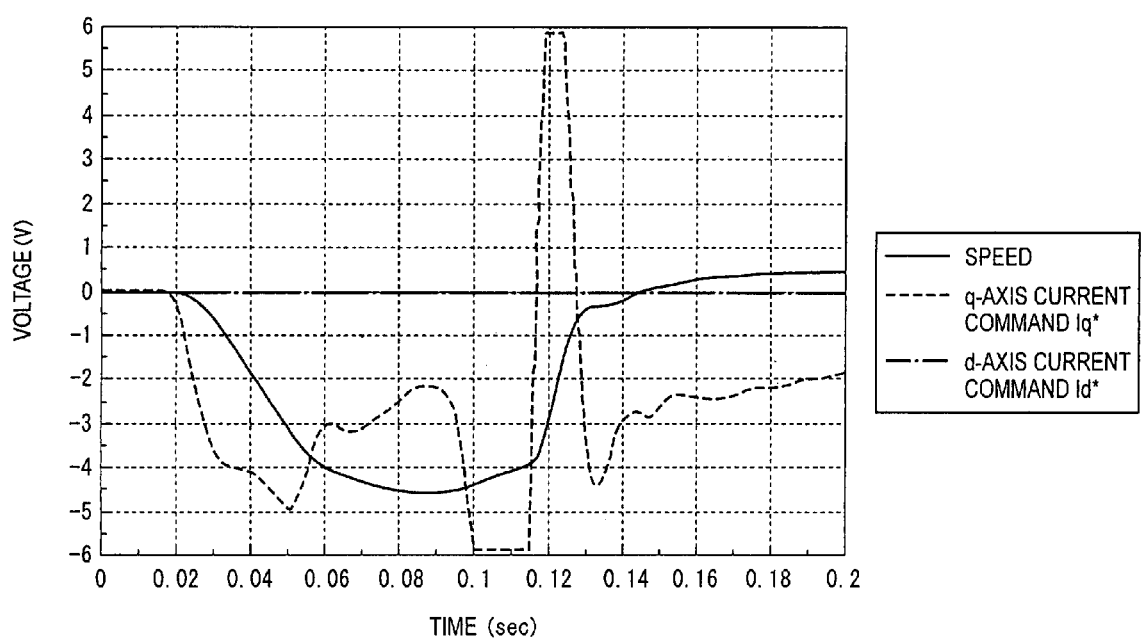
FIG. 6 is a graph showing a d-axis current command Id*, a q-axis current command Iq*, and a speed of an injection shaft according to Comparison 1.

FIG. 6 shows a d-axis current command Id*, a q-axis current command Iq*, and a speed of an injection shaft. The units or the like are the same as in FIG. 5.

Since the d-axis current Id was not supplied, the d-axis current command Id* remained 0. Thus, the q-axis current command Iq* exceeded the range of ±6V between 0.1 sec and 0.13 sec, thereby generating the voltage saturation.

The speed of the injection shaft was not able to be properly controlled because of the voltage saturation, whereby the speed was disturbed between 0.1 sec and 0.15 sec.

The molded battery case was provided with burrs and sink marks.

Example 2

Polypropylene was filled in a barrel of the injection molding machine of the second exemplary embodiment. Then, the injection molding machine injected the polypropylene while a small amount of the polypropylene was left in the barrel. A blank-injection was performed using the small amount of the polypropylene as a lubricant to evaluate a current control when a low-load was applied at high speed. An injection speed was 325 mm/sec.

Figure 7:
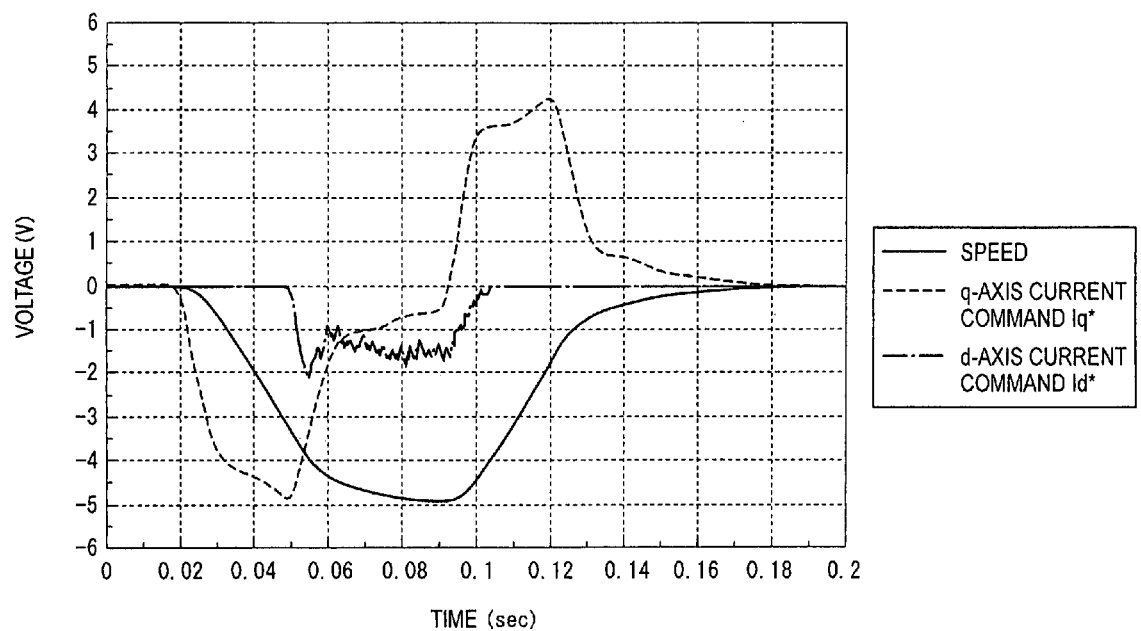
FIG. 7 is a graph showing a d-axis current command Id*, a q-axis current command Iq*, and a speed of an injection shaft according to Example 2.

FIG. 7 shows a d-axis current command Id*, a q-axis current command Iq*, and a speed of an injection shaft at this time. The units or the like are the same as in FIG. 5.

FIG. 7 shows that the voltage saturation was properly prevented similarly to Example 1. Also, comparing the d-axis current command Id* of FIG. 5 with that of FIG. 7, an unnecessary amount of the d-axis current command Id* was decreased in Example 2 in which the blank-injection was performed.

[Comparison 2]

A blank-injection was performed similarly to Example 2, except that the current control method of supplying the d-axis current Id corresponding to the speed as disclosed in Document 1 was carried out.

Figure 8:
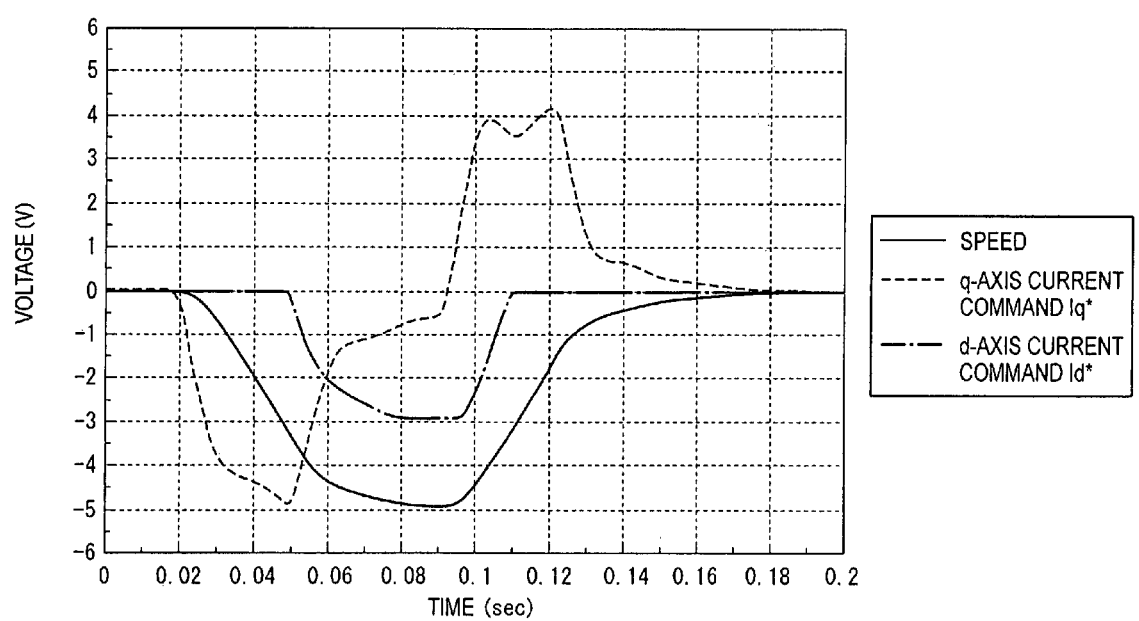
FIG. 8 is a graph showing a d-axis current command Id*, a q-axis current command Iq*, and a speed of an injection shaft according to Comparison 2.

FIG. 8 shows a d-axis current command Id*, a q-axis current command Iq*, and a speed of an injection shaft. The units or the like are the same as in FIG. 5.

FIG. 8 shows that the voltage saturation was prevented. However, compared to FIG. 7, the d-axis current command Id* was increased and therefore an excess and unnecessary amount of the d-axis current Id was supplied compared to the Example 2.

Figure 9:
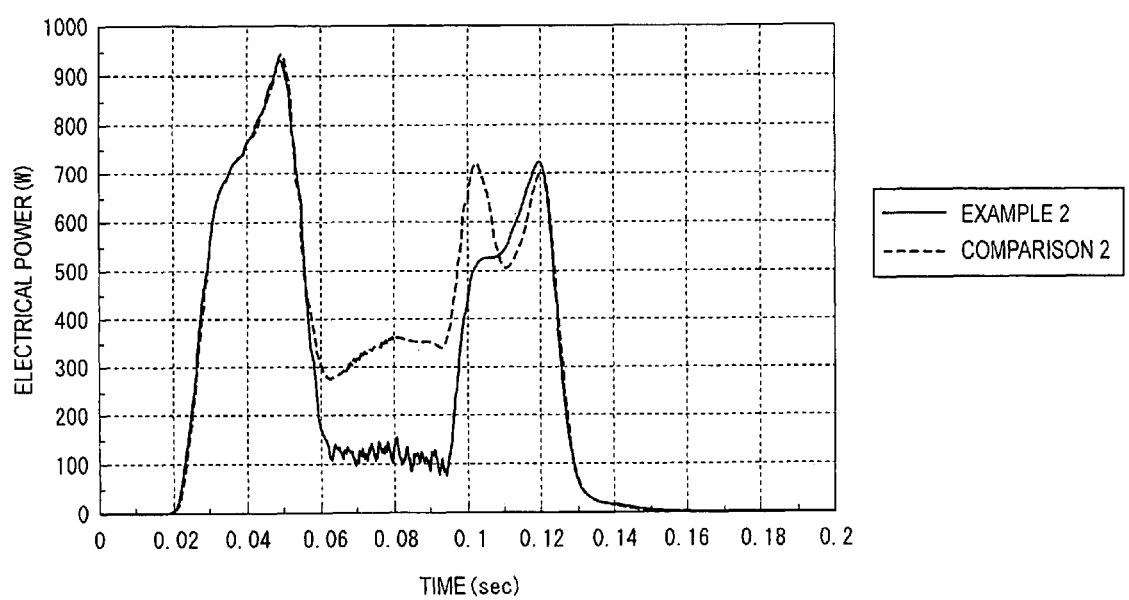
FIG. 9 is a graph showing the change of an electrical power according to Example 2 and Comparison 2.

FIG. 9 shows the change of electrical power in Example 2 and Comparison 2. In FIG. 9, a longitudinal axis represents electrical power (W), and a horizontal axis represents time (sec).

FIG. 9 shows that Example 2, where the d-axis current Id was small, was smaller than Comparison 2 in power consumption.

The entire disclosure of Japanese Patent Application No. 2008-123162, filed May 9, 2008, is expressly incorporated by reference herein.

What is claimed is:

1. A method of controlling a current in a servomotor by supplying a d-axis current to an armature, the servomotor comprising a magnetic field and the armature including armature windings of plural phases, the armature having been subjected to such dq conversion as to bring a d-axis direction into coincidence with a direction of a magnetic field flux, the d-axis current being supplied for prevention of a voltage saturation of the armature when a relative rotation power of the magnetic field and the armature is generated based on an interaction between the magnetic field flux generated by the magnetic field and an armature magnetic flux generated by applying an armature voltage to the armature winding of each phase, the method comprising:

determining a phase angle that is greater than or equal to 0° and less than or equal to 90°; and defining an amount of the d-axis current supplied to the armature, wherein the determining of the phase angle comprises:

setting a predetermined voltage command value threshold that is smaller than a maximum armature voltage, the maximum armature voltage being applicable to the armature winding of each phase without generating the voltage saturation;

continuously comparing a voltage command value with the voltage command value threshold in a predetermined cycle, the voltage command value being a command value of the armature voltage applied to the armature winding of each phase;

extracting a predetermined number (No) of latest comparison results in terms of time from comparison results continuously obtained in the predetermined cycle;

setting the phase angle (θ) to be 0° when a number (N) of the comparison results out of the predetermined number of the comparison results is equal to or less than an integer (Nb), the number being a number of the comparison results that show that at least one of the voltage command values is more than the voltage command value threshold, the integer being set to be less than the predetermined number; and increasing the phase angle depending on largeness of the number when the number is more than the integer, and the defining of the amount of the d-axis current comprises:

defining a q-axis current (Iq) by an equation (1) and defining the d-axis current (Id) by an equation (2) using the phase angle determined in the determining of the phase angle, $$Iq = I \cdot \cos\theta \quad (1)$$

$$Id = -|Id\max| \cdot \sin\theta \quad (2)$$

where I in the equation (1) represents a q-axis current command value for the armature when the d-axis current is not supplied and Idmax in the equation (2) represents a maximum d-axis current that is suitably settable.

2. The method according to claim 1, wherein the maximum d-axis current (Idmax) satisfies a relationship of I<Idmax≦Imax, where Imax represents an allowable maximum current value of the armature.

3. The method according to claim 2, wherein the maximum d-axis current (Idmax) is equal to the allowable maximum current value (Imax).

4. The method according to claim 1, wherein the determining of the phase angle further comprises:

setting a maximum value (θmax) of the phase angle that is greater than or equal to 0° and less than or equal to 90°; and obtaining the phase angle from an equation of θ={(N−Nb)/(No−Nb)}·θmax when the number N is more than the integer Nb.

5. The method according to claim 2, wherein the determining of the phase angle further comprises:

setting a maximum value of the phase angle that is greater than or equal to 0° and less than or equal to 90°; and obtaining the phase angle from an equation of θ={(N−Nb)/(No−Nb)}·θmax when the number N is more than the integer Nb.

6. The method according to claim 3, wherein the determining of the phase angle further comprises:

setting a maximum value of the phase angle that is greater than or equal to 0° and less than or equal to 90°; and obtaining the phase angle from an equation of θ={(N−Nb)/(No−Nb)}·θmax when the number N is more than the integer Nb.

7. A servomotor, comprising: a magnetic field; an armature including armature windings of plural phases; and a controller that controls the magnetic field and the armature, the servomotor supplying a d-axis current to the armature subjected to such dq conversion as to bring a d-axis direction into coincidence with a direction of a magnetic field flux, the de-axis current being supplied for prevention of a voltage saturation of the armature when a relative rotation power of the magnetic field and the armature is generated based on an interaction between the magnetic field flux generated by the magnetic field and an armature magnetic flux generated by applying an armature voltage to the armature winding of each phase, the servomotor further comprising:

a calculator that determines an amount of the d-axis current, wherein the calculator performs determining a phase angle that is greater than or equal to 0° and less than or equal to 90° and defining an amount of the d-axis current supplied to the armature, the determining of the phase angle comprises:

setting a predetermined voltage command value threshold that is smaller than a maximum armature voltage, the maximum armature voltage being applicable to the armature winding of each phase without generating the voltage saturation;

continuously comparing a voltage command value with the voltage command value threshold in a predetermined cycle, the voltage command value being a command value of the armature voltage applied to the armature winding of each phase;

extracting a predetermined number of latest comparison results in terms of time from comparison results continuously obtained in the predetermined cycle;

setting the phase angle (θ) to be 0° when a number of the comparison results out of the predetermined number of the comparison results is equal to or less than an integer, the number being a number of the comparison results that show that at least one of the voltage command values is more than the voltage command value threshold, the integer being set to be less than the predetermined number; and increasing the phase angle depending on largeness of the number when the number is more than the integer, and the defining of the amount of the d-axis current comprises:

defining a q-axis current (Iq) by an equation (1) and defining the d-axis current (Id) by an equation (2) using the phase angle determined in the determining of the phase angle, $$Iq = I \cdot \cos\theta \quad (1)$$

$$Id = -|Id\max| \cdot \sin\theta \quad (2)$$

where I in the equation (1) represents a q-axis current command value for the armature when the d-axis current is not supplied and Idmax in the equation (2) represents a maximum d-axis current that is suitably settable.

* * * * *